United States Patent Office 3,790,514
Patented Feb. 5, 1974

3,790,514
AMPHOTERIC STRENGTHENING AGENTS FOR PAPER
Peter Economou, Bedford, Mass., assignor to American Cyanamid Company, Stamford, Conn.
No Drawing. Application July 22, 1969, Ser. No. 843,838, now Patent No. 3,660,338, which is a continuation-in-part of abandoned application Ser. No. 546,214, Apr. 29, 1966. Divided and this application Apr. 24, 1972, Ser. No. 247,200
Int. Cl. C08d 9/06
U.S. Cl. 260—17.4 ST                     13 Claims

ABSTRACT OF THE DISCLOSURE

Normally liquid water-insoluble polysalt coacervates, wherein one of the component polymers is only weakly ionic, are water-soluble where they contain a sufficient amount of an ionization suppressor.

---

This is a division of copending application Ser. No. 843,838, filed on July 22, 1969, which is now U.S. Pat. No. 3,660,338, and which is a continuation-in-part of my copending application Ser. No. 546,214, filed on Apr. 29, 1966, now abandoned.

The present invention relates to ionically self-cross linked three-dimensional liquid polysalts which normally form insoluble liquid ampholytic coacervates at low concentrations in water; compositions comprising said polysalts and an ionization suppressor therefor; water-soluble polyvalent metal complexes of said polysalts; to metallized complexes thereof; to the compositions in dry and in solution states; and to the preparation thereof.

Liquid polysalts (also termed "polysalt coacervates") are the peculiar group of polysalts which form when a dilute aqueous solution of an anionic polyelectrolyte is mixed with a dilute aqueous solution of a cationic polyelectrolyte, provided at least one of the polyelectrolytes is weak (i.e., provided that it has an ionization constant less than $10^{-3}$, that the molecular weights of the polymers are sufficienly high, and that certain pH and concentration limitations are met) cf. Ind. Eng. Chem. 57, 32 ff. (October 1965) and the polymer content of the resulting mixture is low (e.g., less than about 5%–10% by weight). The liquid polysalts first become apparent to the eye as colloidal droplets which form a haze in the aqueous medium. On standing these droplets spontaneously coalesce to form a homogeneous viscous insoluble fluid phase which contains substantially all of the polysalt which has been formed.

It is a further peculiarity of these polysalts that they are soluble in water at moderate to high concentrations (i.e., at concentrations above about 10% by weight), and become insoluble when the solutions are diluted below about the 10% level with water, the coacervate separating as colloidal droplets in the manner described. Since polymer solutions are customarily prepared for use in paper mills as stock solutions containing about 1% to 5% by weight of the polymer and since the colloidal droplets coalesce and form a separate insoluble phase quite rapidly once they have formed, the utility of the coacervates has been limited.

Liquid polysalts generally have a specific gravity greater than 1, and hence they usually accumulate at the bottom of the reaction flask. If the layer is re-dispersed and if the liquid is allowed to stand, the droplets re-coalesce and sink as before. The polysalts have definite isoelectric points, which are the pH at which they are electrostatically neutral.

The polysalts are three-dimensional (as necessarily results from the polyfunctionality of the polymers of which they are composed), and they are held together chiefly by ionic forces. It is their great peculiarity that, despite their three-dimensional cross-linked structure, they are fluid. They are composed of the anionic polymer (or mixture of anionic polymers) and the cationic polymer (or mixture of cationic polymers) in weight ratio between about 5:95 and 95:5, and are ampholytic.

Up to the present, polysalt coacervates have found little practical utility. The present invention provides important new utility for compositions in this category.

The discoveries have now been made that polysalts of the type described are soluble in aqueous medium at all concentrations when the solution contains an ionization suppressor compatible therewith and that the solutions possess a special utility when the amount of the ionization suppressor is within a critical range, i.e., when the amount of ionization suppressor is sufficient to prevent coacervation of the polysalt from solutions of stock strength, but insufficient to prevent coacervation of the polysalt when the stock solutions are diluted extensively with water. I have further found that polysalt solutions which contain an ionization suppressor within the range described, when added to a paper-making pulp at a suitable pH (and are thereby extensively diluted) release their dissolved content of polysalt almost instantly as a haze of colloidal droplets of polysalt coacervate, that these droplets generally possess sufficient electrostatic charges so that they are almost instantly absorbed (with alum if needed) by the cellulose fibers present, and that when the fibers carrying the adsorbed polysalt are processed into paper in the usual way, the coacervate present on the fibers causes an increase in the strength of the paper.

I have still further found that the colloidal droplets are composed of the polysalt in liquid concentrate state; that the droplets are amphoteric and generally possess useful electrostatic charges over the commonly used pH range of 4 to 8, and that in the manufacture of paper they impart substantially more dry strength on a weight-for-weight basis than is imparted by equal weights of the component polymers when present separately in paper. The strengthening action of the polymers in polysalt coacervate state is therefore more than the sum of the separate strengthening effects of the polymers.

The subject matter of the present invention is thus a composition consisting essentially of (a) an ionically self-crosslinked polysalt of a normally water-soluble polyanionic polymer with a normally water-soluble polycationic starch in weight ratio between 95:5 and 5:95, at least one of said polymers being a weak electrolyte and having an ionization constant less than $10^{-3}$, said polysalt normally forming a liquid ampholytic coacervate in water in concentrations between 1% and 10% by weight, and (b) a water-soluble ionization suppressor compatible therewith, the amount of said ionization suppressor being sufficient to prevent coacervation of said polysalt as a 1%–10% solution in water but insufficient to prevent coacervation of said polysalt when a greater than 1% solution thereof is diluted to about 0.1% to 0.001% solids with water, said ionization suppressor being a substantially monomeric water-soluble material which has an ionization constant larger than $10^{-6}$ and which does not form a precipitate with said polysalt.

The compositions of the present invention can generally be successfully added to paper-making fibrous suspensions over the entire paper-making range customarily employed. In the alkaline range and in preferred instances at neutral pH the colloidal coacervate droplets are substantively adsorbed by the fibers, behaving as if they were wholly cationic. They are thus a new class of dry-strength agents which can be self-adsorbed by cellulose fibers in aqueous suspension and which consequently do not require the addition of alum or other fixing agent.

In certain instances (when the isoelectric point of the droplets is sufficiently low) the colloidal droplets are anionic at acid pH and can be deposited on cellulose fibers by the use of alum. Such polysalts can be used in established acidic paper-making systems, in conjunction with rosin size to produce sized paper of improved dry strength.

The compositions of the present invention need not contain metal, acid, or formaldehyde, and can be employed without use of these materials. They are thus specially suitable for the production of photographic paper.

The compositions of the present invention are readily prepared as dry flakes or powders which are storage-stable and yet which dissolve quickly in cold water. The compositions may thus be shipped in solid state and may be prepared for use by unskilled workers, without need for metering equipment.

The compositions of the present invention described above form complexes with water-soluble polyvalent metal salts, and the resulting metallized polysalts in preferred instances possess superior effectiveness as dry strength imparting agents than the polysalts from which they are derived. This discovery permits the dry-strengthening efficiency of the polysalt to be increased by as much as 75% without a comparable increase in their cost. The metallizing salt thus evidently acts as a fortifying agent for the polysalt, and only a small amount of the metallizing salt is needed for this effect.

When containing amino substituents the adsorbed polysalts act as catalysts for the reaction between stearic anhydride and similar anhydrides and cellulose permitting off-the-machine sizing to be developed by this size under customary paper making conditions.

The aforementioned polysalts may have reacted content of formaldehyde, epichlorohydrin, ethylenediamine, etc., so as to be thermosetting when heated for ¼ to 3 minutes at 190°–250° F. Thermosetting polysalts have the property of imparting wet strength to paper in addition to dry strength.

The ionization suppressor which is present in the compositions of the present invention is any substantially monomeric water-soluble material which has an ionization constant larger than $10^{-6}$ (i.e., which has a pK less than 6), and which is compatible with the polysalt (i.e., which does not form a precipitate therewith). Preferred ionization supressors are the strong bases (sodium hydroxide, potassium hydroxide, tetramethyl ammonium hydroxide and ammonium hydroxide); strong water-soluble acids having a pK less than 6 including formic and acetic acids and particularly the very strong acids (sulfuric acid, hydrochloric acid, nitric acid, sulfurous acid, phosphoric acid, benzenesulfonic acid, dichloroacetic acid, and trichloroacetic acid), and the water-soluble highly ionizing salts (sodium sulfate, the sodium phosphates, magnesium sulfate, calcium chloride, etc.). Since it is preferred to use the polysalt in cationic state, acids and neutral or acid salts are preferred as ionization suppressor.

The minimum amount of ionization suppressor which is present in compositions of the present invention is that which is sufficient to maintain the polysalt soluble at stock concentrations, i.e., at polysalt concentrations in excess of about 1% by weight, and which is insufficient to maintain the polysalt in soluble state when the solution is diluted to the concentration at which it finds its ultimate use (i.e., to about 0.1% to 0.001% polymer solids) with water.

A still larger amount of the ionization suppressor may be present when it is desired to prevent gelation of the solution of the composition as it ages. For in-plant purposes, it is generally sufficient to employ sufficient of the ionization suppressor to maintain 1% by weight solution of the poly-salt soluble for 1 day at 20° C. When the composition is to be shipped, however, sufficient of the ionization suppressor should be present to maintain the polysalt in water-soluble state while in transit and while awaiting use. It is readily possible to provide sufficient of the ionization suppressor to maintain the polysalt soluble in a stock solution for 30 days at 20° C. In these instances the amount of ionization suppressor may be too much to permit the colloidal haze to form when the solution is diluted to the range specified, in which event the excess should be neutralized with acid or alkali. It is readily feasible to suppress more than 99% of the ionization by addition of a sufficient amount of ionization suppressor. However, sufficient ionic covalent or other forms of bonding exist between the macromolecules (as can be determined by viscosity measurements) so that the polysalt as a whole is of three-dimensional structure.

The composition in dried state (i.e., a dry blend of the polysalt and a normally solid ionization suppressor) need contain only a minimal amount of the ionization suppressor, as the composition is generally used within 24 hours after being dissolved in water. If desired, however, the composition may and advantageously will contain larger amounts of the ionization suppressor to guard against the inconvenience of gelation, should scheduled consumption of the polysalt be delayed.

The suitable amount of ionization suppressor required in each instance to suppress ionization to the extent required depends on a large number of variables including the ionization constant of the particular suppressor used, the ionization characteristics of the polymers present and their concentration in the aqueous phase, the extent to which the stock solution will be diluted to cause formation of the colloid, and the pH and salt content and temperature of the aqueous medium used as diluent, so that the proper amount cannot be determined from any rule. However, a suitable amount in any instance can be found by laboratory trial.

The compositions of the present invention find use as strengthening agents for paper and also as flocculants for organic matter in aqueous suspension (such as the fines in paper mill white water). When used as strengthening agents, the compositions may be added in dilute (5%–1% polysalt solids) state to the aqueous suspension of cellulose paper-making fibers, preferably as close to the wire as possible, for example, at the head box. Best results are generally obtained when the pH of the aqueous medium to which they are added is that at which the polysalt composition forms a colloidal haze.

The polysalt ionization suppressor solutions of the presesnt invention may be added to any fibrous suspension having a pH at which polysalt coacervate droplets form and possess ionic properties when the solution undergoes sufficient dilution. On the other hand, it is possible to vary the pH at which any given polysalt-ionization suppressor soltuion forms the colloidal droplets. Increasing the proportion of cationic polymer in the polysalt tends to elevate the pH at which the droplets exist, and increasing the proportion of anionic polymer tends to decrease the pH at which these droplets exist. In this way a polysalt solution can be adapted to a given fibrous suspension, and this is usually more convenient than altering the pH of the suspension to conform to the characteristics of the polysalt solution.

The suitability of any given polysalt-ionization suppressor solution as a wet end additive to any given papermaking system can be determined by laboratory trial with actual formation of hand sheets. If the colloidal poly-salt coacervate droplets formed in the procedure are self-absorbed by the fibers (or if they can be deposited on the fibers by the action of alum), the polysalt composition is suitable for use in that system. Should no coacervate droplets form, or if no retention of the coacervate droplets should occur, the pH of the system should be adjusted up or down until retention is achieved.

The correct pH can also be determined in the laboratory by making a series of handsheets over a pH range, and determining the dry-strengths of the handsheets. Best colloid formation generally occurs at the pH at which the dry strength of the sheets is at a maximum. It will generally be found also that at this pH very satisfactory retention (i.e., substantive absorption) of the colloidal droplets occurs.

A small amount of the polysalt (e.g., ¼% based on the dry weight of the fibers) in preferred instances produces sufficient coacervate droplets to cause a significant strengthening action, and evidently less may be used to advantage. On the other hand, the strengthening imparted by the polysalt tends to level off when more than 3%–5% of the polysalt is added (based on the dry weight of the fibers) so that an amount in this range may be regarded as the practical maximum for paper manufacturing purposes.

The polysalts employed develop their strengthening properties under normal conditions of drying, that is, when the wet web is dried in the range of 90°–125° C. for ¼–3 minutes as is customary.

Strongly anionic polymers of which coacervating liquid polysalts may be composed include poly(sulfostyrene), poly(allylsulfonic) acid, sulfonated urea-formaldehyde resin (formed by reacting urea-formaldehyde with sodium metabisulfite), sulfonated polymethylolacrylamide, the water-soluble half ester of polyvinyl alcohol with sulfuric acid; and the foregoing polymers wherein part of the acid substituents are converted to amide state.

Weakly anionic polymers which may be present in coacervating liquid polysalts include polyacrylic acid, polymethacrylic acid, dimethylol urea-sulfur dioxide condensation products; hydrolyzed styrene-vinyl acetate-maleic anhydride copolymer (1:2:3 molar ratio); and the 90:10 acrylamide:acrylic acid copolymer.

Strongly cationic polymers which may be present in coacervating polysalts are those which contain a substantial proportion of strongly cationic substituents such as quaternary ammonium, quaternary phosphonium and quaternary sulfonium substituents and include poly(p-vinylbenzylamine) converted to a tertiary amine and quaternized with methyl bromide; poly(diethylaminoethyl acrylate) quaternized with methyl chloride; polyvinylpyridine quaternized with ethyl chloride; and the thermosetting polymer prepared by reacting adipic acid with diethylene triamine in 1:1 molar ratio to form a higher molecular weight water-soluble "backbone" followed by reaction with epichlorohydrin to form a highly cationic water-soluble thermosetting resin.

Weakly cationic polymers are, in general, cationic polymers the cationic substituents of which are not quaternary ammonium, phosphonium or sulfonium substituents. Weakly cationic polymers thus include polyvinylamine, polyethyleneimine, acrylamide-vinylpyridine copolymer, poly(diethylaminoethyl acrylate), the alkylenepolyamine-epichlorohydrin resins and the 1.2:0.2:1.6 molar ratio methylamine:ammonia:epichlorohydrin resin formed by substantially completely reacting the components to a point short of gelation.

As has been stated, polysalts which are composed of strongly anionic polymers and strongly cationic polymers generally are not liquid and hence are not suitable for the purposes of the present invention.

The viscosity of the polysalt-ionization suppressor combinations varies with the molecular weights of the polymers of which they are composed. When the polysalt composition imparts dry strength only (i.e., when no wet strength resin is present in the composition) the strengthening effect improves with increasing molecular weight on the part of at least one of the polymers therein; and as a practical matter at least one of the polymers in the compositions should have a molecular weight in excess of 50,000. The composition is more efficient as a flocculating agent when at least one of the polymers has a molecular weight in excess of 1,000,000 and particularly when the molecular weight of the anionic polymer is in excess of 5,000,000.

The lowest molecular weight possessed by polymers which form liquid coacervates has not been ascertained, but a normal liquid coacervate has been obtained by admixture of a cationic polymer of about 5,000–10,000 molecular weight with an anionic polymer of about 150,000 molecular weight.

The preferred compositions of the present invention are those wherein the ionization suppressor is an acid or acid salt (so that the coacervate colloid droplets will be cationic) and wherein a water-soluble metallizing salt is present such as have been previously employed as agents for fixing rosin size on paper-making fibers. Metallizing salts are the water-soluble salts of aluminum, cerium, cobalt, chromium, copper, nickel, and zirconium and include alum, aluminum chloride, aluminum acetate, aluminum benzoate, aluminum nitrate, ferric sulfate, ceric sulfate, and zirconium sulfate. Those which have been employed commercially to fix rosin size on cellulose fibers include aluminum sulfate, chloride and acetate. Formation of the new metallized complex occurs almost instantly; the reaction is ionic. The metallized composition disperses in aqueous medium within the pH range of 3–10 substantially as readily as does the composition before metallization.

The manner in which the polysalt becomes metallized has not been ascertained. However, addition of the polyvalent metal salt causes the viscosity of the polysalt solution to increase. When the polysalt solution is viscous before addition of the metallizing salt, addition of a preferred amount of the metallizing salt may cause the solution to change to a rigid gel. This gel can be comminuted to a free-flowing powder and, surprisingly, with or without comminution, dissolves readily in cold water. When the solution contains less than about 10%, by weight of polysalt, the solution generally remains of pumpable viscosity after addition of the metallizing salt and if too viscous can be rendered pumpable by addition of water.

The amount of metallizing salt which should be added for best fortifying action varies from instance to instance and depends upon the particular salt which is selected and the particular polysalt solution to which it is added. The optimum amount, however, is readily found by laboratory trial. In general, I have found that the addition of as little as 5% by weight of aluminum sulfate to a polysalt solution produces a perceptible fortifying action, and that about 30% is about the most that need be added to obtain maximum fortifying effect; the percentages are based on the aluminum salt in anhydrous state and on the weight of the polysalt in the solution. It is often advantageous to add larger amounts of the metallizing salt than the amount needed to produce maximum fortification because while the resulting complex possesses less than maximum efficiency as a strengthening agent for paper, the low cost of the metallizing salt permits a net decrease in the cost of producing a given level of dry strength. The salts thus act as extenders in addition to acting as fortifying agents.

In general, the compositions of the present invention are conveniently prepared by forming a fluid aqueous solution of a suitable anionic polymer, forming a similar solution of a cationic polymer, adding a compatible ionization suppressor to one of the solutions, and mixing the two solutions.

The optional metallizing salt is most conveniently added to the polysalt composition as the final step. It should not be added to the anionic polymer solution ahead of the ionization suppressor as it will tend to form an insoluble precipitate with the polymer. If desired it can be added to the cationic polymer solution prior to admixture with the anionic polymer solution.

The resulting solutions may be used as such, or they may be freeze-dried. When the ionization suppressor is non-volatile and the component polymers non-thermosetting, the compositions may be drum- or spray-dried and their solid content recovered as flakes or powder. These products possess excellent storage stability and dissolve rapidly in cold water with regeneration of the parent solution. The polymers, ionization suppressors and metallizing salts used, and the weight ratios, pK and pH values and temperatures employed, should conform to the values set forth above and illustrated by the examples. The manufacture of paper by use of polysalt compositions of the present invention is disclosed and claimed in my copending application Ser. No. 843,782 filed herewith, now U.S. Pat. No. 3,677,888.

The invention is further illustrated by the examples which follow. These examples are preferred embodiments of the invention and are not to be construed as limitations thereon.

EXAMPLE 1

The following illustrates the preparation and properties of solutions of a variety of three-dimensional water-soluble normally coacervating ampholytic polysalts and the preparation of colloidal coacervate dispersions therefrom, according to the present invention.

In each instance the polysalt is prepared by admixture of an aqueous solution of an anionic polymer with an aqueous solution of a cationic polymer in such proportions as supply the polymers the ratios shown in the table below, at least one of the polymers being a weak polyelectrolyte, also as shown in the table. The polymers are mixed as solutions at room temperature which contain about the maximum amount of polymer while permitting easy stirrability (about 10%–20% by weight of polymer). The ionization suppressor is added to one of the polymer solutions before the solutions are mixed; it is immaterial to which solution the ionization suppressor is added. The particular ionization suppressor which is added and the amount thereof is shown in each instance in the table.

The foregoing polysalt compositions may be vacuum concentrated to 25% by weight solids and are stable for at least 10 days at 20° C. At that concentration they are clear, viscous but easily pumpable solutions which can be readily diluted to 2% solids by admixture with cold water. The resulting solutions are clear and are readily diluted further with water. They develop a colloidal haze almost instantly when diluted to 0.1%–0.001% solids with water.

The haze (polysalt coacervate) droplets are all sufficiently cationic to be adsorbed by cellulose paper-making fibers in aqueous suspension within the pK range of about 4–8, so that when added to a suspension having a pH in the range of 6 in amounts sufficient to provide 0.5% of polysalt on the dry weight of fibers, the fibers are sheeted to form paper, and the paper is dried at a temperature between 190 F. and 250° F., the resulting paper possesses significantly improved dry tensile and burst strength and in certain instances (e.g., Runs 9 and 10) substantial wet strength. Typically, the dry strength improvements which are obtained range between 20% and 60% of the strength which the paper possesses when containing no strengthening agent.

EXAMPLE 2

The following illustrates the varied paper-making conditions in which a polysalt composition of the present invention can be employed as wet-end additive for the manufacture of paper of improved dry strength.

An aqueous solution of a three-dimensional water-soluble ionically normally coacervating polysalt of the present invention is prepared mixing 750 g. of a hot (60° C.) 14% by weight solution of the anionic copolymer of Run 1 of Example 1 with 10 g. of 100% $H_2SO_4$, and introducing the mixture with stirring under the surface of 235 g. of a 36% by weight solution of the cationic polymer of Run 1 of Example 1. The weight ratio of the two polymers (dry basis) is thus 55:45. When homogenous the solution is adjusted to pH 1.8 by addition of 38% HCl. It contains 19% resin solids and is stable about 1 month at 40° C.

Runs 1–4.—These runs illustrate the effect of increasing amounts of the polysalt composition as strengthening

| | Coacervating ampholytic polysalt | | | | | |
|---|---|---|---|---|---|---|
| | | | Polymers | | Ionization suppressor | |
| Run No. | Water-soluble anionic polymer | Water-soluble cationic polymer | Wt. ratio [1] | Type [2] | Name | Percent [3] |
| 1 | Acrylamide-acrylic acid copolymer [4] | Adipic acid TEPA polymers epi [5] | 55:45 | W-W | $Na_2SO_4$ | 33 |
| 2 | do | do | 55:45 | W-W | NaCl | 45 |
| 3 | do | do | 55:45 | W-W | $Na_2HPO_4$ | 25 |
| 4 | do | do | 55:45 | W-W | $H_2SO_4$ | 5 |
| 5 | do | Methylamine-ammonia-epi [6] | 55:45 | W-W | $MgSO_4$ | 33 |
| 6 | do | do | 55:45 | W-W | $CaCl_2$ | 45 |
| 7 | do | do | 55:45 | W-W | $KH_2PO_4$ | 25 |
| 8 | do | do | 55:45 | W-W | $Cl_3COOH$ | 5 |
| 9 | do | Diethylene triamine-epi [8] | 55:45 | W-W | HCl | 5 |
| 10 | do | do | 55:45 | W-W | $CCl_3COOK$ | 45 |
| 11 | Acrylamide-styrene-maleic anh. copol.[7] | Methylamine-ammonium-epi [6] | 55:50 | W-W | $H_2SO_4$ | 6 |
| 12 | Acrylamide:acrylic acid copol.[4] | Polyacrylamide-ethylenediamine [9] | 80:20 | W-W | $Na_2SO_4$ | 10 25 |
| 13 | Casein (as sodium salt) | Adipic acid-TEPA polymer-epi [5] | 70:30 | W-W | NaCl | 40 |
| 14 | Acrylamide-acrylic acid copol.[4] | Acrylamide-DMP plus DMS [11] | 50:50 | W-S | $ZnCl_2$ | 33 |
| 15 | do | Acrylamide-acrylic acid-DADMAC [12] | 15:85 | W-S | $H_2SO_4$ | 6 |
| 16 | do | Poly(vinylbenzyl trimethyl ammonium chloride) | 70:30 | W-S | $H_3PO_4$ | 33 |
| 17 | Acrylamide allylsulfonic acid [13] | Poly(diethylaminoethylacrylate) | 50:50 | S-W | $(NH_4)_2SO_4$ | 35 |
| 18 | Poly(sulfomethyleneacrylamide) [14] | Polyethylenimine [15] | 60:40 | S-W | $Na_2HPO_4$ | 25 |
| 19 | Sulfonated polystyrene [16] | Diethylenetriamine-epi [8] | 20:80 | S-W | $MgSO_4$ | 35 |

[1] Of anionic polymer to cationic polymer.
[2] Based on the pK values of anionic polymer and cationic polymer. W-W means that both are weak; S-W means that the anionic polymer is strong and that the cationic polymer is weak, and W-S means the reverse. A polymer having a pK value below about 2 is regarded as "strong" for this classification.
[3] Based on the weight of the polysalt (the combined weights of the anionic and the cationic polymers).
[4] 90:10 molar ratio; molecular weight approx. 400,000.
[5] Prepared by reacting 0.3 mol of epichlorohydrin with a 1:1 molar ratio adipic acid:tetraethylenepentamine condensate to form a water-soluble substantially non-thermosetting product. Molecular weight=approximately 10,000–25,000.
[6] Prepared by condensing the reagents in 1.2:0.2:1.6 molar ratio to the point of incipient gelation.
[7] 40:45:15 molar ratio; molecular weight approx. 200,000.
[8] 1:3 molar ratio, condensed to the point of incipient gelation.
[9] Prepared by heating 7 parts by weight of polyacrylamide with 42 parts of ethylenediamine to a point close to just short of gelation.
[10] Plus 2% of 100% $H_2SO_4$.
[11] 90:10 acrylamide:dimethylpyridine copolymer quaternized with dimethyl sulfate.
[12] 94:2:4 acrylamide:acrylic acid:diallyl dimethyl ammonium chloride copolymer, molecular weight 750,000.
[13] Approximately 1 sulfur group per phenyl group; molecular weight 400,000.
[14] Prepared by reacting polyacrylamide with formaldehyde and sodium bisulfite (1:1:1 molar ratio) in aqueous solution.
[15] Molecular weight approximately 50,000.
[16] Approximately 1 sulfo group per phenyl group; molecular weight approximately 400,000.

agent for paper. The runs are made on a continuous laboratory experimental paper-making machine supplied with a 70:30 bleached hardwood:bleached softwood kraft pulp at 2% consistency to form paper having a basis weight of 50 lbs. per 25" x 40"/500 ream. The pulp is acidified with concentrated sulfuric acid to pH 5.8 and 0.75% alum is added based on dry weight on the fibers (giving the pulp a pH of 5.5), after which the polysalt composition is added at the headbox as a 2% solution in amounts sufficient to provide amounts of the polysalt as shown in the table below. Two seconds elapse while the solution is being mixed into the pulp, which then has a consistency of 0.6%.

Runs 5–9.—These runs illustrate the effect of changes in the pH of the fibrous suspensions. They are made in the laboratory by adding 0.5% (based on the dry weight of the fibers) of the polysalt solution to an aqueous suspension of 50:50 bleached hardwood:bleached softwood kraft pulp at pH 6 and a consistency of 0.6%, adjusting the pH of the suspension with concentrated HCl or NaOH to the values shown in the table below, sheeting the suspension to form a wet web, and drying the web for 1 minute on a drum drier having a drum temperature of 240° F. The paper has a basis weight of 100 lb.

Runs 10–16.—The effect of alum is illustrated by repetition of the procedure of runs 5–9 except that alum in amounts in the table below is added prior to addition of the polysalt solution, the amount of polysalt which is added is constant, and the pH of the suspension is adjusted to 5.5 after addition of the solution.

Results are as follows.

| Run No. | Percent alum added [1] | Percent polysalt added | Final pH of suspension | Dry strength [3] Found lb./in.[2] | Percent increase |
|---|---|---|---|---|---|
| 1 | 0.5 | None | 5.5 | 23 | |
| 2 | 0.5 | 0.2 | 5.5 | 29.5 | 28 |
| 3 | 0.5 | 0.4 | 5.5 | 35.0 | 52 |
| 4 | 0.5 | 0.6 | 5.5 | 37.0 | 61 |
| 5 | | None | 6.0 | 48 | |
| 6 | | 0.5 | 5.5 | 65 | 35 |
| 7 | | 0.5 | 6.0 | 64 | 33 |
| 8 | | 0.5 | 6.5 | 60 | 25 |
| 9 | | 0.5 | 7.0 | 57 | 19 |
| 10 | None | None | 5.5 | 53 | |
| 11 | None | 0.5 | 5.5 | 73 | 38 |
| 12 | 0.1 | 0.5 | 5.5 | 78 | 47 |
| 13 | 0.3 | 0.5 | 5.5 | 81 | 53 |
| 14 | 0.5 | 0.5 | 5.5 | 82 | 55 |
| 15 | 1.0 | 0.5 | 5.5 | 80 | 51 |
| 16 | 1.5 | 0.5 | 5.5 | 79 | 49 |
| 17 | 2.0 | 0.5 | 5.5 | 78 | 47 |

[1] Based on dry weight of fibers.
[2] Polymer content of complex based on dry weight of the fibers.
[3] By Mullen (burst) test.

The results show that pre-treatment of the fibers with alum increases by about 10% the dry strength imparted by the polysalt. From other work it is known that the maximum improvement does not always result from the addition of 0.3% alum, but that in certain instances, evidently depending on the character of the pulp, the optimum effect is produced by the use of larger or smaller amounts.

EXAMPLE 3

The following illustrates the prepartion of polysalts according to the present invention having net anionic charges.

The procedure of Example 1 is repeated except that no acid is added and sufficient concentrated ammonium hydroxide is added to the anionic copolymer to provide a polysalt solution having a pH of 10.5.

The products are useful in aqueous starch-clay paper coating compositions where they act to insolubilize the starch and to bind the clay particles when the compositions are applied to paper and the paper is dried at 190°–250° F.

EXAMPLE 4

The following illustrates the storage stability of polysalt solutions of the present invention as a function of the kind and amount of ionization suppressor therein.

To 55 g. of a 20% by weight solution of a 1:0.2:1.3 molar ratio water-soluble methylamine:ammonia:epichlorohydrin condensation product prepared by condensing these materials to the point of incipient gelation is added with stirring first sufficient concentrated hydrochloric acid to produce final pH values as shown in the table below (i.e., the pH after mixture of the solutions) and then 45 g. of a 20% by weight solution of a 90:10 polyacrylamide:acrylic acid copolymer of molecular weight 400,000. A clear solution of the cationic polysalt forms in each instance containing 20% by weight of polysalt. Samples of each solution (Runs 1–5) are stored at 40° C. and are observed from time to time for gelation.

The procedure is repeated using $Na_2SO_4$ as the ionization suppressor (Run 6) and is further repeated with sodium hydroxide to form the anionic polysalt (Runs 7–10). Results are as follows, shown in comparison with the results obtained when no ionization suppressor is added.

| Run number | Ionization suppressor | Final pH of solution [1] | Time to gel at 40° C. |
|---|---|---|---|
| 1 | None | 5.0 | A few minutes. |
| 2 | HCl | 4.0 | 4 hours. |
| 3 | HCl | 2.5 | 1 month. |
| 4 | HCl | 2.0 | 2.5 months. |
| 5 | HCl | 1.6 | >3 months. |
| 6 | $Na_2SO_4$ | [2] 6.0 | 3 weeks. |
| 7 | NaOH | 8.5 | 2 hours. |
| 8 | NaOH | 9.5 | 2 days. |
| 9 | NaOH | 10.5 | 3 weeks. |
| 10 | NaOH | 11.5 | 3 months. |

[1] After the solutions have been mixed. Acid or base is added as necessary to produce the designated pH.
[2] Contains 35% $Na_2SO_4$ based on the weight of the polysalt.

The solutions remain clear when diluted to 2% solids by addition of water and form the coacervate haze when diluted to 0.01% solid with tap water.

EXAMPLE 5

The following illustrates the properties possessed by two coacervating polysalts according to the present invention wherein there is a major difference between the molecular weights of the anionic resin components of these polysalts.

Polysalt No. 1.—A polysalt is prepared by taking 55 g. of a 25% by weight solution of anionic 90:10 acrylamide:acrylic acid copolymer having a molecular weight of about 400,000, adding 2.5 g. of 100% sulfuric acid thereto, and mixing the resulting solution with 45 g. of a 25% by weight solution of the adipic acid tetraethylenepentamine-epichlorohydrin condensate of footnote 5 of Example 1. The product is a crystal-clear, transparent solution which remains stable for more than three months at 40° C.

Polysalt No. 2.—The procedure for the preparation of polysalt No. 1 is repeated except that the molecular weight of the anionic copolymer is approximately 5,000,000.

The two solutions are tested to determine their respective efficiencies as dry strength agents for paper and as flocculating agents for paper fines by pretreating a 50:50 bleached hardwood:bleached softwood kraft pulp at 0.6% consistency beated to a Canadian standard freeness of 410 cc. with 0.5% alum, dividing the pulp into aliquots, adding the solutions (diluted to 2% solids) to provide polysalt in the amount shown in the table below, adjusting the pH of the aliquots to 6.0, determining the Canadian standard freeness of the aliquots, forming the pulps into handsheets, and determining the Mullen dry strength of handsheets, as shown in Example 2 (Runs 5–8). Results are as follows.

| Run No. | Polysalt | | Pulp flocculation [2] | | Paper dry strength [3] | |
|---|---|---|---|---|---|---|
| | Molec. weight [1] | Percent added | Found, cc. | Percent increase | Found, lb./in.$^2$ | Percent increase |
| 1 | Control | None | 410 | | 45 | |
| 2 | 400,000 | 0.2 | 450 | 7.3 | 57 | 27 |
| 3 | 400,000 | 0.5 | 500 | 22.0 | 70 | 55 |
| 4 | 5,000,000 | 0.2 | 680 | 66.0 | 54 | 20 |
| 5 | 5,000,000 | 0.5 | 690 | 68.2 | 65 | 44 |

[1] Of anionic polymer.
[2] Canadian standard freeness. The higher the volume (cc.) of water which is released by the pulp, the greater the flocculation of the pulp.
[3] By Mullen test (burst).

Comparison of the results of Run 2 with the results of the control run and Run 4, and comparison of the results of Run 3 with the results of the control run and Run 5, show that the low molecular weight polymer produced comparatively little floccuation of the pulp but caused a major strengthening effect, whereas the high molecular weight polymer produced the greatest amount of flocculation but a comparatively little improvement in dry strength.

EXAMPLE 6

The following illustrates a three-dimensional water-soluble ionic polysalt in dry particulate free-flowing state, according to the present invention.

The 20% resin solids content polysalt solution of Example 4 is spray-dried at a drying air temperature of 450° F. A free-flowing powder is recovered. This powder dissolves almost instantly in water at 20° C.

A similar product is obtained when the solution is drum-dried.

EXAMPLE 7

The following illustrates a physical mixture of components which, on dissolution of water, forms a polysalt solution having substantially the same properties as the product of Example 5.

In a bottle are placed 20 g. of a coarsely ground 90:10 acrylamide:acrylic acid copolymer having a molecular weight of 400,000 80 g. of powdered water-soluble cationic starch (prepared by spray drying a cooked cationic starch solution), and 30 g. of powdered sodium sulfate. The resulting blend remains non-caking for one month.

The resulting blend dissolves rapidly to 2% solids in water at 20° C. The solution provides satisfactory dry strength when employed as a beater additive in the manufacture of paper as described herein.

EXAMPLE 8

The following illustrates a continuous process for the manufacture of a dilute aqueous solution of a polysalt according to claim 1 suitable for direct addition to pulp in a commercial paper-making plant.

A day tank is nearly filled with water. To this tank is added 10% based on the weight of water of a 90:10 acrylamide:acrylic acid copolymer having a molecular weight of 400,000 and sufficient sulfuric acid to decrease the pH of the polymer solution to 3.5. Into a similar tank is charged 50% by weight of a solution of the water-soluble condensation product of 1 mol of methylamine, 0.2 mol of ammonia and 1.6 mol of epichlorohydrin at pH 3. The solution in each tank is pumped through a metering pump where it is diluted to 5% solids with water. The two resulting streams are combined at a siamese and the resulting single stream is supplied to the headbox of a paper-making machine at such rate as to supply 0.5% of the polysalt (solids based on the dry weight of the fibers). At the point of addition the pH of the paper-making fibrous suspension is adjusted to 6.

The dry strength of the paper is much better than the dry strength of similar paper made by addition of 0.5% of the acrylamide-acrylic acid copolymer and alum, or by addition of 0.5% of the cationic resin.

EXAMPLE 9

The following illustrates the preparation of a water-soluble metallized complex of an amphoteric polysalt having one of its ionic functions substantially completely suppressed, the drying of the metallized polysalt to free-flowing particulate state, and the comparative effectiveness of the thus-dried metallized polysalt as dry strength agent against its parent polysalt when employed on fibers that have (and have not been) pretreated with alum.

The procedure of Example 2 is repeated for the preparation of the aqueous solution of the polysalt containing the ionization suppressor. The amount of suppressor is sufficient to suppress substantially all of the ionization of the carboxylic substituents of the acrylamide-acrylic acid copolymer content of the polysalt, so that the polysalt is present in cationic state.

The solution is then divided into two portions.

One portion is retained as control and to this nothing is added. This portion is used to make a series of runs to illustrate the strengthening imparted by the polysalt in unmetallized state when used without and with prior addition of alum to the pulp.

To the other portion is added 20% papermaker's alum $[Al_2(SSO_4)_3 \cdot 14H_2O]$, based on the weight of polysalt in the solution. A pronounced rise in viscosity occurs at once resulting from formation of a metallized derivative of the polysalt. This portion is dried on a laboratory drum drier having a drum temperature of 220° F. Flakes are obtained which are storage-stable and which can be readily crushed to a free-flowing powder. The resulting powder dissolves readily in water at 20° C. and a 1% by weight solution is prepared.

A series of dry strength paper handsheets is prepared by standard laboratory procedure which comprises forming an aqueous suspension of well-beaten 50:50 bleached hardwood-bleached softwood kraft paper-making fibers at consistency of 0.6%, removing aliquots from the suspension, adding the polysalt solution in amount to provide 0.5% of the polysalt based on the dry weight of the fibers, adjusting the pH of the suspensions to 5.5, sheeting the suspensions to provide handsheets of dry basis weight of 100 lb. per 25" x 40"/500 ream, drying the handsheets in a laboratory drum drier having a drum temperature of 240° F., and determining the Mullen dry strength of the resulting paper.

A second series of handsheets is prepared by the same method except that 1 minute prior to addition of the strengthening agent alum is added to the fibrous suspensions in amounts shown in the table below.

A primary control sheet is made without use of the polysalt or alum.

| Run No. | Alum added [1] | Polysalt added [2,3] | | Paper dry strength [5] | |
|---|---|---|---|---|---|
| | | Weight percent | Aluminum content [4] | Lb./in.$^2$ | Percent increase |
| 1 | None | None | None | 53 | |
| 2 | None | 0.5 | None | 73 | 37.8 |
| 3 | 0.1 | 0.5 | None | 78 | 47.0 |
| 4 | 0.3 | 0.5 | None | 81 | 52.8 |
| 5 | 0.5 | 0.5 | None | 82 | 54.5 |
| 6 | 1.0 | 0.5 | None | 80 | 51.0 |
| 7 | 1.5 | 0.5 | None | 79 | 49.0 |
| 8 | 2.0 | 0.5 | None | 78 | 47.0 |
| 9 | None | 0.5 | 0.1 | 89 | 68.0 |
| 10 | 0.1 | 0.5 | 0.1 | 88 | 66.0 |
| 11 | 0.3 | 0.5 | 0.1 | 87 | 64.1 |
| 12 | 0.5 | 0.5 | 0.1 | 86 | 62.2 |
| 13 | 1.0 | 0.5 | 0.1 | 84 | 58.5 |
| 14 | 1.5 | 0.5 | 0.1 | 82 | 54.5 |
| 15 | 2.0 | 0.5 | 0.1 | 81 | 52.8 |

[1] Based on dry weight of fibers. The alum is added to the pulp prior to addition of the polysalt solution.
[2] Weight of polymers in polysalt based on dry weight of the fibers.
[3] Contains ionization suppressor (mixture of $H_2SO_4$ and HCl).
[4] As alum (based on addition of 20% by weight of $Al_2(SO_4)_3 \cdot 14H_2O$ to polysalt solution).
[5] Mullen.

Comparison of Runs 1, 2 and 9 indicates that (without alum pretreatment of the fibers) the polysalt in unmetallized state produced an increase in dry strength of 37.8% but in metallized state produced an increase of 68.0%. The comparison also shows that best dry strength is achieved when the polysalt is added in metallized state and no alum is present in the fibrous suspension to which the polysalt solution is added.

Comparison of Runs 2–8 among themselves indicates that the unmetallized polysalt imparts best dry strength when the fibers in the pulp are pretreated with alum.

EXAMPLE 10

The following illustrates the properties of a three-dimensional ionically self-cross linked polysalt composition according to the present invention from polysalts which do not interact covalently with each other.

To a 10% by weight solution of poly(N-methylpyridinium)chloride having a molecular weight of about 500,000 is added sufficient hydrochloric acid to give the solution a pH of 2. There is then added an equal weight of a 10% by weight solution of a 90:10 acrylamide:acrylic acid copolymer. The viscosity of the resulting solution is higher than the viscosity of either of the starting solutions showing that the acid had not suppressed ionization of all the carboxyl substituents and that some ionic cross-linkages form. The mixture is clear, but develops a haze when diluted with water to a 0.001% polysalt content.

What is claimed is:

1. A composition consisting essentially of (a) an ionically self-crosslinked polysalt of a normally water-soluble polyanionic polymer with a normally water-soluble polycationic starch in weight ratio between 95:5 and 5:95, at least one of said polymers being a weak electrolyte and having an ionization constant less than $10^{-3}$, said polysalt normally forming a liquid ampholytic coacervate in water in concentrations between 1% and 10% by weight, and (b) a water-soluble ionization suppressor compatible therewith, the amount of said ionization suppressor being sufficient to prevent coacervation of said polysalt as a 1%–10% solution in water but insufficient to prevent coacervation of said polysalt when a greater than 1% solution thereof is diluted to about 0.1% to 0.001% solids with water, said ionization suppressor being a substantially monomeric water-soluble material which has an ionization constant larger than $10^{-6}$ and which does not form a precipitate with said polysalt.

2. An aqueous solution of a composition according to claim 1.

3. A solution according to claim 2 having a viscosity in excess of 1,000 centipoises as a 30% aqueous solution at 25° C.

4. A composition according to claim 1 wherein the number of cationic substituents in said polysalt are in excess of the number of anionic substituents therein.

5. A composition according to claim 1 wherein the polysalt is a salt of a water-soluble anionic vinyl polymer at least 80 mol percent composed of $$-CH_2CH(CONH_2)-$$

linkages.

6. A composition according to claim 2 wherein the anionic polymer is a thermosetting polymer.

7. A composition according to claim 1 wherein the ionization suppressor is an acid having a pK less than 6.

8. A composition according to claim 1 wherein the ionization suppressor is a water-soluble salt the cation of which is a metal having a valence not in excess of 2.

9. A composition according to claim 1 wherein the amount of ionization suppressor is insufficient to maintain said polysalt soluble when said 1%–10% solution of said polysalt is diluted to about 0.1% solids with water.

10. A composition according to claim 1 wherein the amount of said ionization suppressor is sufficient to maintain said polysalt stable for at least 30 days as a 25% by weight solution in water at 20° C.

11. A composition according to claim 7 containing a small but effective amount of a normally water-soluble metallizing salt as latent fortifying agent for said polysalt.

12. A composition according to claim 11 wherein the metallizing salt is aluminum sulfate.

13. A composition according to claim 1 consisting essentially of a blend of a 90:10 molar ratio acrylamide:acrylic acid copolymer, water-soluble cationic starch, and sodium sulfate, in dry, particulate, free-flowing state.

References Cited

UNITED STATES PATENTS

| 3,467,647 | 9/1969 | Benninga | 260—17.4 ST |
| 3,575,868 | 4/1971 | Galvin et al. | 260—17.4 ST |

FOREIGN PATENTS

| 477,265 | 9/1951 | Canada | 162—168 |
| 17,051 | 5/1963 | Japan | 162—168 |

WILLIAM H. SHORT, Primary Examiner

E. WOODBERRY, Assistant Examiner

U.S. Cl. X.R.

161—164, 168, 175

UNITED STATES PATENT OFFICE
CERTIFICATE OF CORRECTION

Patent No. 3,790,514           Dated February 5, 1974

Inventor(s)  PETER ECONOMOU

It is certified that error appears in the above-identified patent and that said Letters Patent are hereby corrected as shown below:

Column 1, lines 16-17, change "coacervates, wherein" to read -- coacervates (wherein --; Column 1, line 18, change "ionic, are" to read -- ionic) are --; Column 12, line 27, in the formula, change "($SSO_4)_3$" to read -- ($SO_4)_3$ --; Column 12, line 46, change "in" to read -- on --.

Signed and sealed this 30th day of July 1974.

(SEAL)
Attest:

McCOY M. GIBSON, JR.  
Attesting Officer

C. MARSHALL DANN  
Commissioner of Patents